US012731744B2

(12) United States Patent
Ogawa et al.

(10) Patent No.: US 12,731,744 B2
(45) Date of Patent: Sep. 8, 2026

(54) ELECTROMAGNETIC RELAY

(71) Applicant: OMRON Corporation, Kyoto (JP)

(72) Inventors: Shinichi Ogawa, Kyoto (JP); Ryota Minowa, Kyoto (JP)

(73) Assignee: OMRON CORPORATION, Kyoto (JP)

(*) Notice: Subject to any disclaimer, the term of this patent is extended or adjusted under 35 U.S.C. 154(b) by 208 days.

(21) Appl. No.: 18/844,979

(22) PCT Filed: Jan. 16, 2023

(86) PCT No.: PCT/JP2023/000916
§ 371 (c)(1),
(2) Date: Sep. 9, 2024

(87) PCT Pub. No.: WO2023/188700
PCT Pub. Date: Oct. 5, 2023

(65) Prior Publication Data

US 2025/0266227 A1 Aug. 21, 2025

(30) Foreign Application Priority Data

Mar. 31, 2022 (JP) ................................ 2022-060455

(51) Int. Cl.
*H01H 50/02* (2006.01)
*H01H 50/14* (2006.01)
*H01H 50/54* (2006.01)

(52) U.S. Cl.
CPC ............ *H01H 50/02* (2013.01); *H01H 50/14* (2013.01); *H01H 50/54* (2013.01)

(58) Field of Classification Search
CPC ........ H01H 50/02; H01H 50/14; H01H 50/54; H01H 50/045; H01H 50/546
(Continued)

(56) References Cited

U.S. PATENT DOCUMENTS 3,800,252 A * 3/1974 Aigner .................. H01H 50/54 200/283
3,835,425 A * 9/1974 Karch .................. H01H 50/045 335/132
(Continued)

FOREIGN PATENT DOCUMENTS

JP 2010-10055 A 1/2010
JP 2010-10059 A 1/2010
(Continued)

OTHER PUBLICATIONS

The International Search Report of International Application No. PCT/JP2023/000916 issued on Mar. 20, 2023.
(Continued)

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a fixed contact, a fixed terminal, a movable contact, a movable contact piece, and a housing. The fixed terminal includes an outer terminal portion and a contact support portion. The housing includes a body, a cover, an adhesive, and a support portion. The body has an opening. The cover closes the opening. The adhesive bonds the body to the cover. The support portion protrudes laterally from the body. The support portion is disposed below and supports the outer terminal portion of the fixed terminal. The support portion includes a support surface and a connection portion. The support surface is in contact with the outer terminal portion of the fixed terminal. The connection portion is disposed between the support surface and the body and is connected to the body with a gap between it and the outer terminal portion of the fixed terminal.

7 Claims, 9 Drawing Sheets

(58) Field of Classification Search
USPC .......................................................... 335/196
See application file for complete search history.

(56) References Cited

U.S. PATENT DOCUMENTS

| | | | | |
|---|---|---|---|---|
| 3,943,031 | A * | 3/1976 | Krueger .................. | B65B 51/10 53/89 |
| 4,223,370 | A * | 9/1980 | Quere .................... | H01H 50/14 361/600 |
| 4,314,578 | A * | 2/1982 | Lederman ................. | F15B 5/00 137/84 |
| 5,689,400 | A * | 11/1997 | Ohgami ................ | G06F 1/1658 361/679.59 |
| 5,796,579 | A * | 8/1998 | Nakajima ............... | G06F 1/203 361/727 |
| 10,396,621 | B2 * | 8/2019 | Hattori .................... | F04B 35/04 |
| 2009/0322455 | A1 | 12/2009 | Yoshihara et al. | |
| 2013/0033344 | A1 | 2/2013 | Morimura | |
| 2019/0122844 | A1 * | 4/2019 | Minowa ................. | H01H 50/58 |
| 2021/0083404 | A1 | 3/2021 | Harimochi et al. | |
| 2023/0163582 | A1 * | 5/2023 | Shimizu ................. | H02G 3/088 174/66 |

FOREIGN PATENT DOCUMENTS

| | | |
|---|---|---|
| JP | 2013-37775 A | 2/2013 |
| JP | 2021-48026 A | 3/2021 |

OTHER PUBLICATIONS

The Written Opinion of the International Searching Authority of International Application No. PCT/JP2023/000916 issued on Mar. 20, 2023.

* cited by examiner

ELECTROMAGNETIC RELAY

CROSS-REFERENCE TO RELATED APPLICATION

This application is the U.S. National Phase of International Application No. PCT/JP2023/000916, filed on Jan. 16, 2023. This application claims priority to Japanese Patent Application No. 2022-060455, filed Mar. 31, 2022. The contents of both of those applications are incorporated by reference herein in their entireties.

FIELD

The claimed invention relates to an electromagnetic relay.

BACKGROUND

Some electromagnetic relays have a fixed terminal protruding laterally from the housing. For example, the electromagnetic relay of Japan Patent Application Publication No. 2010-10055 includes a fixed terminal protruding from the side surface of the housing. The housing includes a support portion protruding from the side surface. The support portion supports the fixed terminal. A nut is connected to the fixed terminal, and a bolt is enmeshed in the nut. The bolt and the nut secure a connecting member such as a bus bar to the fixed terminal.

When fixing the connecting member to the fixed terminal, the torque from bolting is transmitted to the housing via the support portion. Therefore, the housing must have high strength against torque from bolting. For example, some electromagnetic relays have a housing that includes a case and a cover, and the case and the cover are bonded together by an adhesive. In such an electromagnetic relay, a large torque applied to the housing by bolting may affect the adhesive bonding.

SUMMARY

An object of the claimed invention is to improve the strength of the housing against torque due to bolting. An embodiment of an electromagnetic relay in accordance with the claimed invention includes a fixed contact, a fixed terminal, a movable contact, a movable contact piece, and a housing. The fixed terminal has a plate shape. The fixed terminal includes an outer terminal portion and a contact support portion. The contact support portion is connected to the fixed contact. The movable contact faces the fixed contact. The movable contact piece is connected to the movable contact. The housing includes a body, a cover, an adhesive, and a support portion. The body includes an opening. The body houses the contact support, the fixed contact, the movable contact, and the movable contact piece. The cover is attached to the body. The cover closes the opening. The adhesive bonds the body to the cover. The support portion protrudes laterally from the body. The support portion is disposed below the outer terminal portion of the fixed terminal. The outer terminal protrudes laterally from the body. The support portion supports the outer terminal portion of the fixed terminal. The support portion includes a support surface and a connection portion. The support surface is in contact with the outer terminal portion. The connection portion is located between the support surface and the body. The connection portion is connected to the body. The connection portion is disposed with a gap between it and the outer terminal portion of the fixed terminal.

In the embodiment of the electromagnetic relay, the connection portion is disposed with a gap between it and the outer terminal portion of the fixed terminal. Therefore, when torque from bolting is applied to the outer terminal portion of the fixed terminal, it is difficult for the torque to be transmitted to the connection portion. This increases the strength of the housing against torque from bolting.

The support portion may include a nut compartment recessed from the support surface. In this case, the bolt is secured to the outer terminal by a nut disposed in the nut compartment. The outer terminal may include a through-hole for a bolt to pass through.

The through-hole may face the nut compartment. In this case, a connecting member such as a bus bar is fixed to the fixed terminal by passing a bolt through a nut in the nut compartment and the through-hole in the outer terminal portion of the fixed terminal.

The support portion may further include an intermediate portion. The intermediate portion may be located between the connection portion and the support surface. The intermediate portion may extend in an inclined direction relative to the outer terminal. In this case, the strength of the support portion is improved.

The support portion may further include a recess and a rib. The recess may be recessed from the surface of the intermediate portion. The rib may be disposed in the recess. In this case, the rib increases the strength of the intermediate portion.

The body may include a slit extending from the opening. The outer terminal may extend through the slit. In this case, installation of the fixed terminal in the housing is facilitated.

The connection portion may be located away from the slit. In this case, it is difficult for the torque from bolting to be transmitted to the portion of the housing adjacent to the slit. This increases the strength of the housing against torque from bolting.

DETAILED DESCRIPTION

Figure 1:
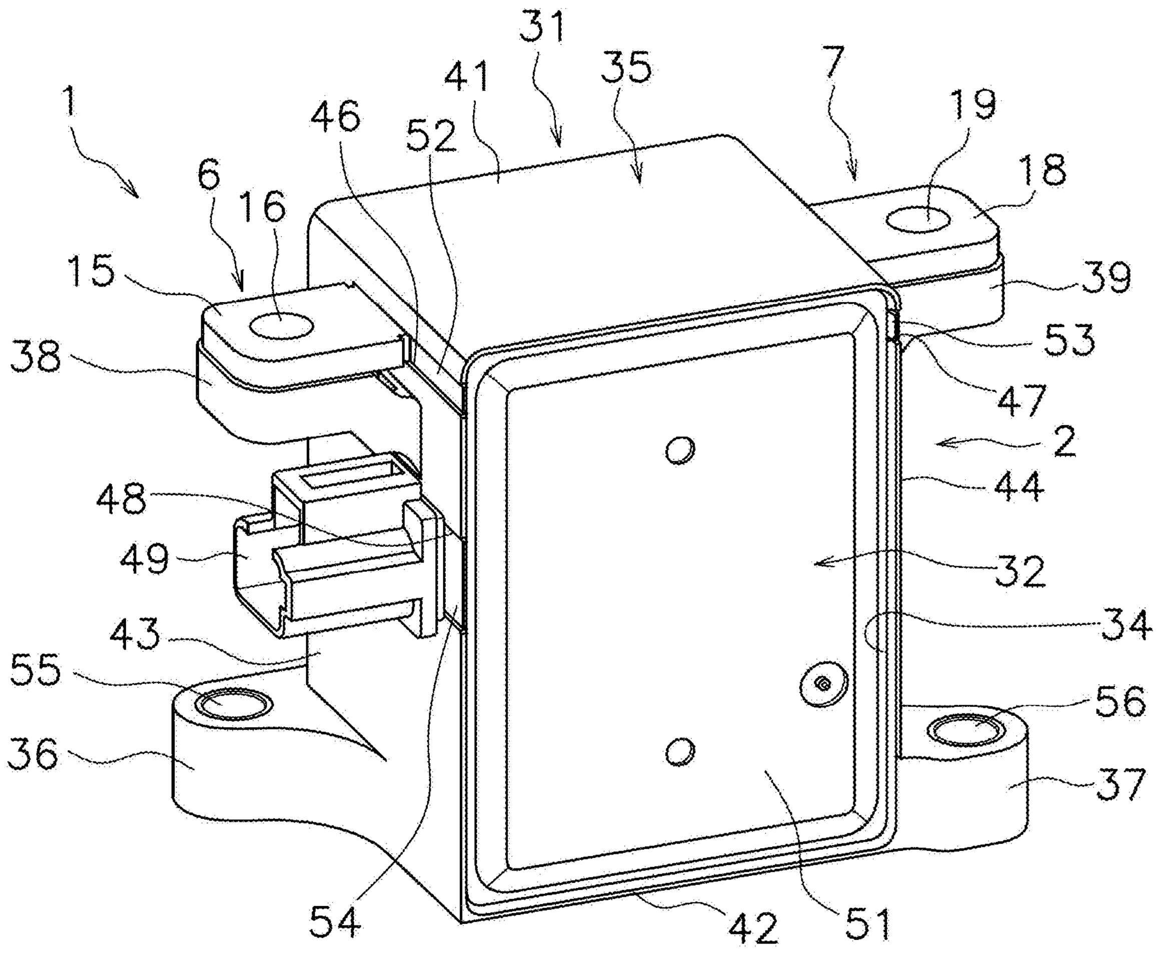
FIG. 1 is a perspective view of an embodiment of an electromagnetic relay in accordance with the claimed invention.
Figure 2:
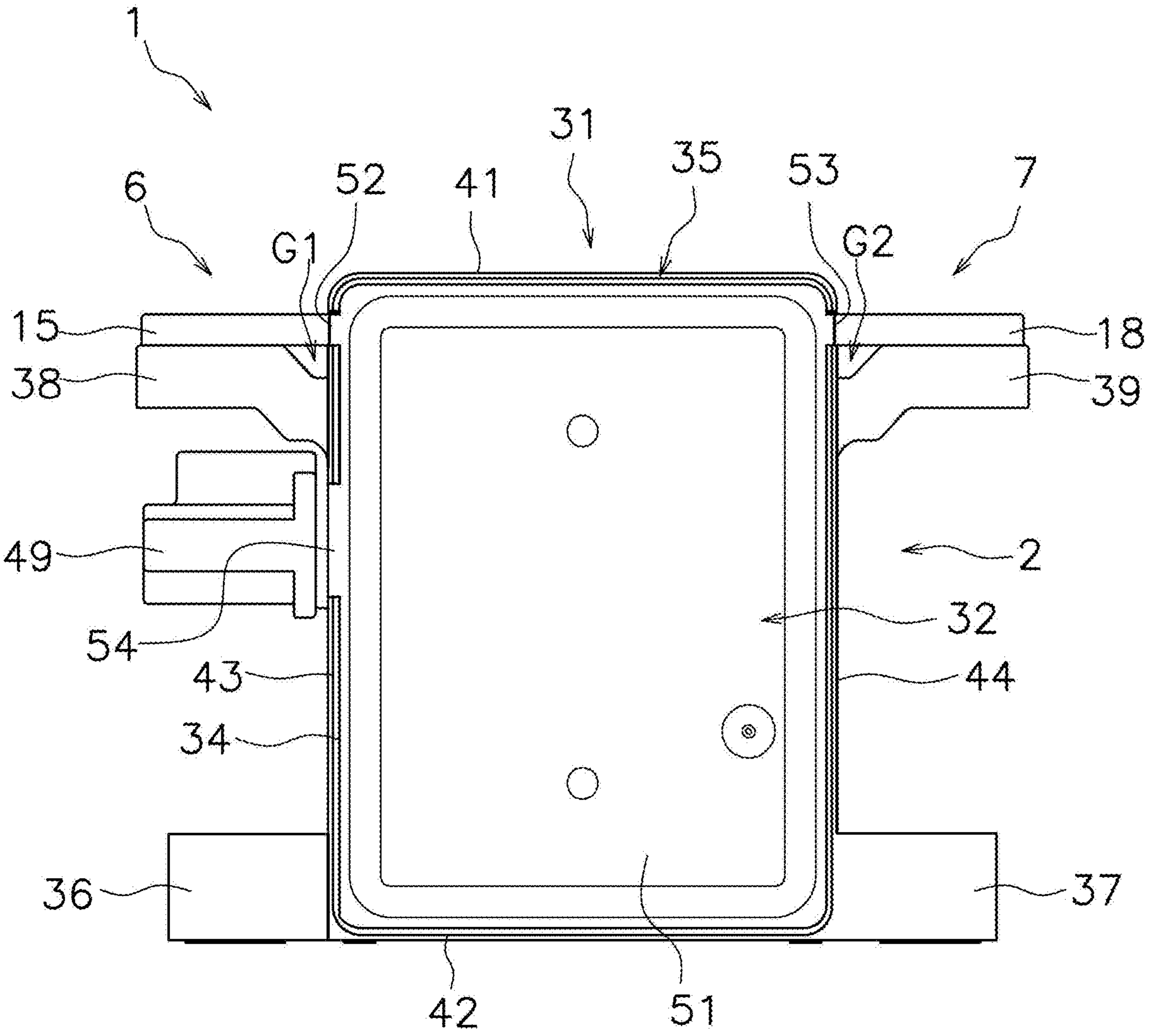
FIG. 2 is a front view of the electromagnetic relay.
Figure 3:
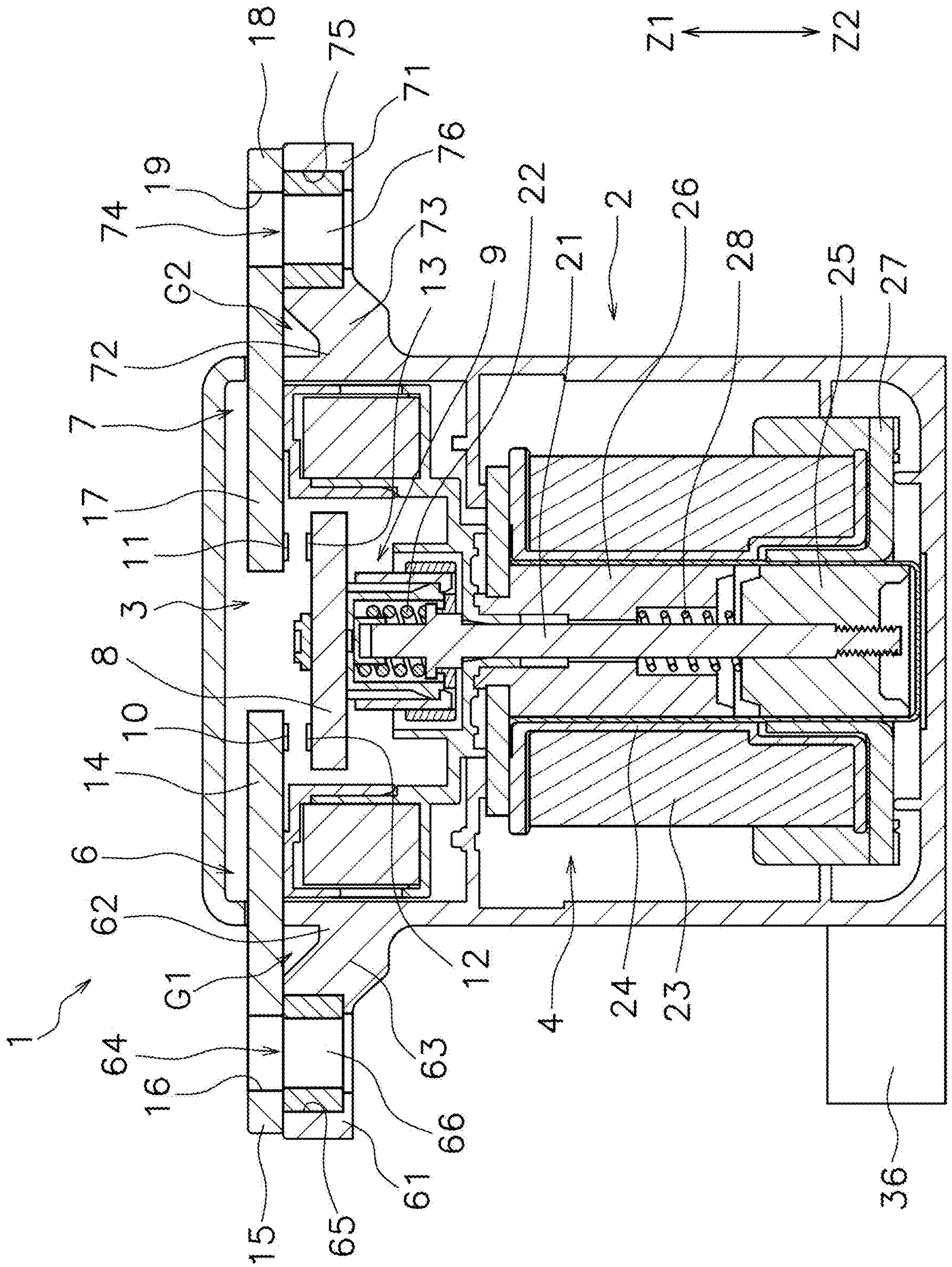
FIG. 3 is a cross-sectional view of the electromagnetic relay.

Hereinafter, an exemplary embodiment of an electromagnetic relay in accordance with the claimed invention will be described with reference to the drawings. FIG. 1 is a perspective view of an embodiment of an electromagnetic relay 1. FIG. 2 is a front view of the electromagnetic relay 1. FIG. 3 is a cross-sectional view of the electromagnetic relay 1. As shown in FIGS. 1 to 3, the electromagnetic relay 1 includes a housing 2, a contact device 3, and a drive device

4. The housing 2 houses the contact device 3. The contact device 3 includes a first fixed terminal 6, a second fixed terminal 7, a movable contact piece 8, a movable mechanism 9, a first fixed contact 10, a second fixed contact 11, a first movable contact 12, and a second movable contact 13.

In the following description, the direction in which the fixed contact 10 and the movable contact 12 face each other is defined as the vertical direction. The direction perpendicular to the vertical direction is defined as the lateral direction. The lateral direction includes the left-right and front-back directions. The longitudinal direction of the movable contact piece 8 is defined as the left-right direction. The direction perpendicular to the vertical direction and the left-right direction is defined as the front-back direction. The direction from the movable contacts 12 and 13 to the fixed contacts 10 and 11 is defined as the contact direction (Z1). The direction from the fixed contacts 10 and 11 to the movable contacts 12 and 13 is defined as the separation direction (Z2).

The first fixed terminal 6, the second fixed terminal 7, the movable contact piece 8, the first fixed contact 10, the second fixed contact 11, the first movable contact 12, and the second movable contact 13 are made of conductive material. For example, the first fixed terminal 6, the second fixed terminal 7, and the movable contact piece 8 are made of metal materials known as terminal materials, such as copper-based metals. However, the first fixed terminal 6, the second fixed terminal 7, and the movable contact piece 8 may be made of different materials. The first fixed contact 10, the second fixed contact 11, the first movable contact 12, and the second movable contact 13 are made of metal materials known as contact materials, such as copper-based metals or silver-based metals.

The first fixed terminal 6 and the second fixed terminal 7 are disposed apart from each other in the left-right direction. The first and second fixed terminals 6 and 7, respectively, have a plate shape. The first fixed terminal 6 and the second fixed terminal 7 protrude from inside of the housing 2 to the outside of the housing 2. The first fixed contact 10 is connected to the first fixed terminal 6. The second fixed contact 11 is connected to the second fixed terminal 7. The first fixed contact 10 and the second fixed contact 11 are disposed inside of the housing 2.

The first fixed terminal 6 includes a first contact support portion 14 and a first outer terminal portion 15. The first fixed contact 10 is connected to the first contact support portion 14. The first outer terminal portion 15 includes a first through-hole 16 for a bolt. The first outer terminal portion 15 protrudes laterally from the housing 2. The second fixed terminal 7 includes a second contact support portion 17 and a second outer terminal portion 18. The second fixed contact 11 is connected to the second contact support portion 17. The second outer terminal portion 18 includes a second through-hole 19 for a bolt. The second outer terminal portion 18 protrudes laterally from the housing 2. The second outer terminal portion 18 protrudes from the housing 2 on the opposite side from the first outer terminal portion 15.

The movable contact piece 8, the first movable contact 12, and the second movable contact 13 are disposed inside of the housing 2. The first movable contact 12 and the second movable contact 13 are connected to the movable contact piece 8. The first movable contact 12 faces the first fixed contact 10. The second movable contact 13 faces the second fixed contact 11. The first movable contact 12 is disposed apart from the second movable contact 13 in the left-right direction.

Figure 4:
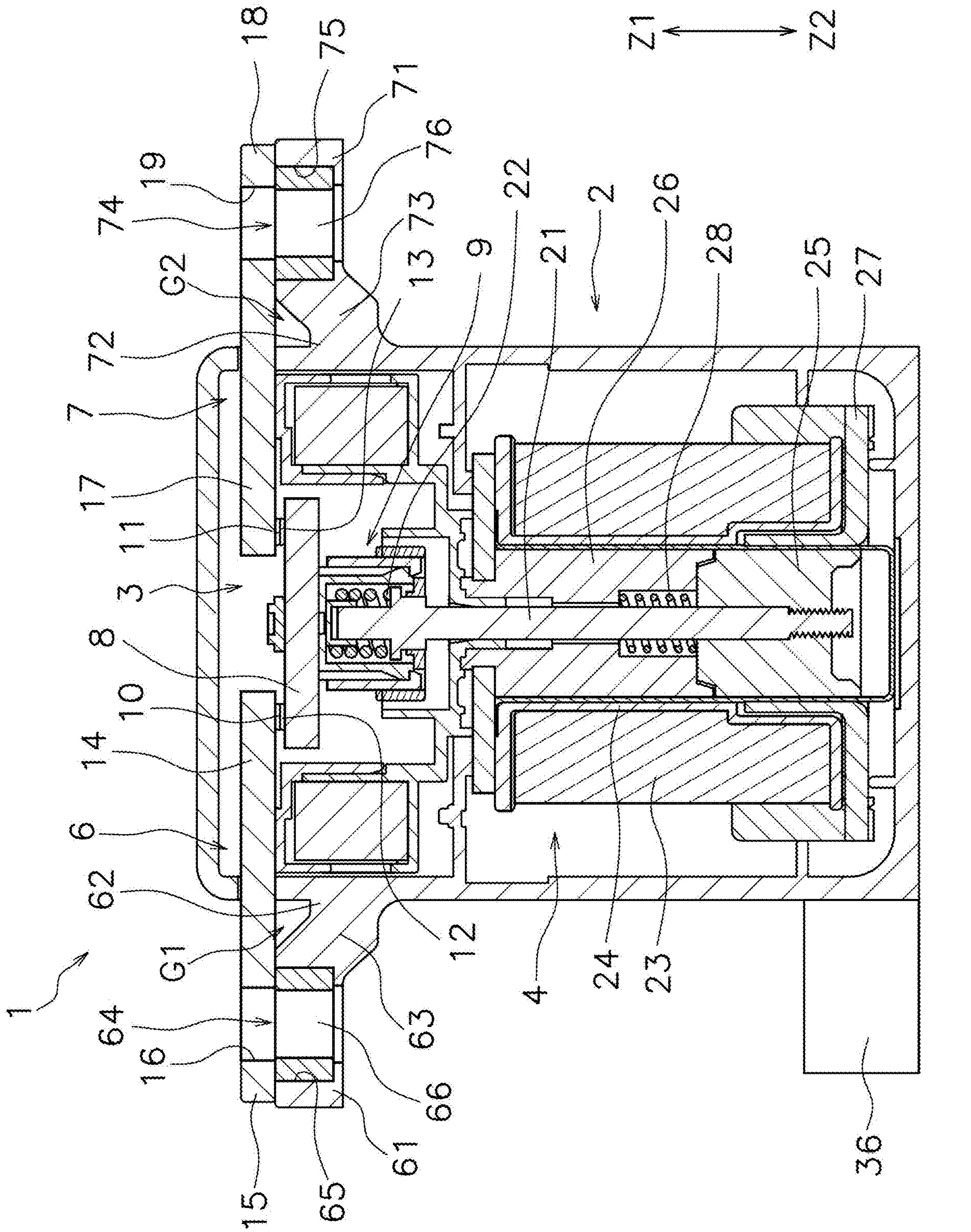
FIG. 4 is a cross-sectional view of the electromagnetic relay.

The movable contact piece 8 is movable in the vertical direction. The movable contact piece 8 is configured to move between an open position shown in FIG. 3 and a closed position shown in FIG. 4. As shown in FIG. 3, with the movable contact piece 8 in the open position, the movable contacts 12 and 13 are separated from the fixed contacts 10 and 11. As shown in FIG. 4, with the movable contact piece 8 in the closed position, the movable contacts 12 and 13 are in contact with the fixed contacts 10 and 11.

The movable mechanism 9 supports the movable contact piece 8. The movable mechanism 9 includes a drive shaft 21 and a contact spring 22. The drive shaft 21 is connected to the movable contact piece 8. The drive shaft 21 extends in the vertical direction and penetrates the movable contact piece 8 in the vertical direction. The drive shaft 21 is movable in the vertical direction. The contact spring 22 biases the movable contact piece 8 toward the contact direction (Z1).

As shown in FIGS. 3 and 4, the drive device 4 moves the drive shaft 21 in the vertical direction. The drive device 4 includes a coil 23, a spool 24, a movable iron core 25, a fixed iron core 26, a yoke 27, and a return spring 28. The drive device 4 moves the movable contact piece 8 to the open and closed positions via the movable mechanism 9 by electromagnetic force. The coil 23 is wound around the spool 24. The movable iron core 25 and the fixed iron core 26 are disposed in the spool 24. The movable iron core 25 is connected to the drive shaft 21. The movable iron core 25 is movable in the vertical direction. The fixed iron core 26 is disposed to face the movable iron core 25. The return spring 28 biases the movable iron core 25 in the separation direction (Z2).

In the electromagnetic relay 1, when the coil 23 is energized, the magnetic force from the coil 23 attracts the movable iron core 25 to the fixed iron core 26. Thereby, the movable iron core 25 and the drive shaft 21 move in the contact direction (Z1) against the biasing force of the return spring 28. Thereby, the movable contact piece 8 moves to the closed position shown in FIG. 4, and the movable contacts 12 and 13 contact the fixed contacts 10 and 11. After the movable contacts 12 and 13 contact the fixed contacts 10 and 11, the contact spring 22 is compressed by the drive shaft 21 moving further in the contact direction (Z1).

When the coil 23 is de-energized, the movable iron core 25 and the drive shaft 21 move in the separation direction (Z2) by the biasing force of the return spring 28. Thereby, the movable contact piece 8 moves to the open position shown in FIG. 3, and the movable contacts 12 and 13 separate from the fixed contacts 10 and 11.

Figure 5:
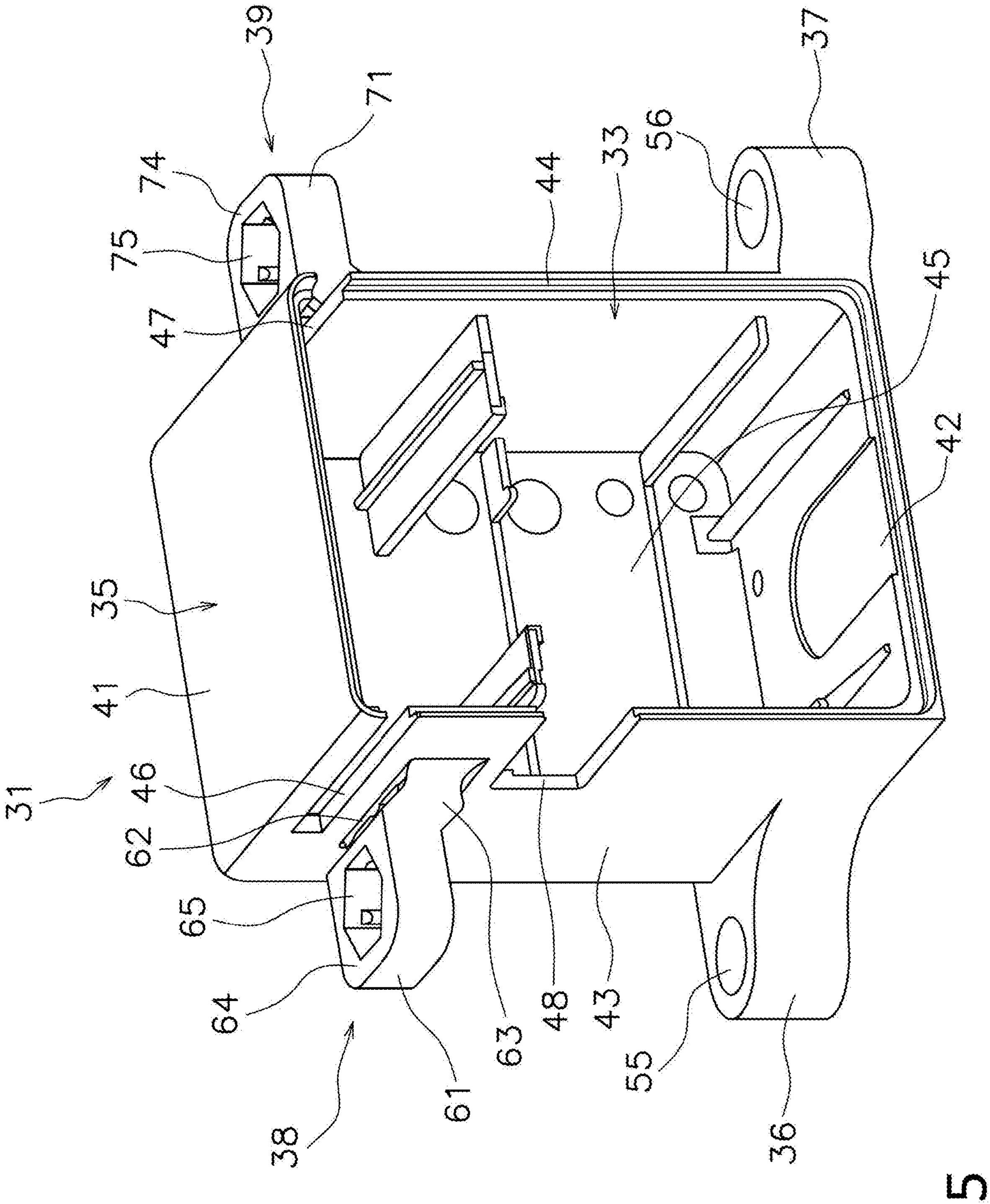
FIG. 5 is a perspective view of a case used in the electromagnetic relay shown in FIGS. 1-4.

The structure of the housing 2 is described next. As shown in FIGS. 1 and 2, the housing 2 includes a case 31 and a cover 32. The case 31 and the cover 32 are separate bodies from each other. FIG. 5 is a perspective view of the case 31. As shown in FIG. 5, the case 31 includes an opening 33. The contact device 3 and the drive device 4 described above are disposed in the case 31 through the opening 33. Afterward, the cover 32 is attached to the case 31 to close the opening 33. The case 31 and the cover 32 are made of resin. The case 31 and the cover 32 are bonded together by adhesive 34. The adhesive 34 is applied between the case 31 and the cover 32 in a liquid state and then cures to bond the case 31 and the cover 32.

Figure 6:
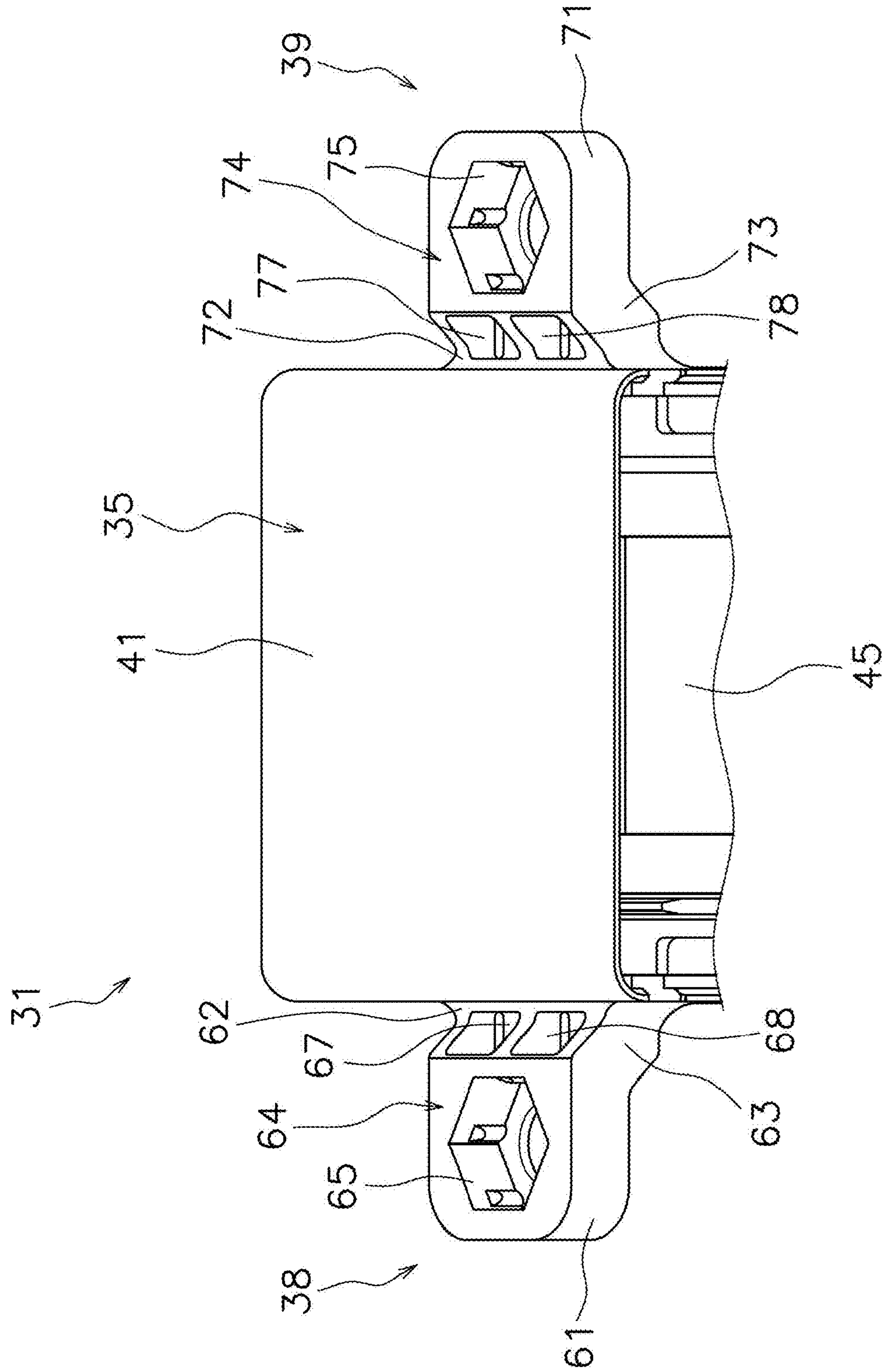
FIG. 6 is a perspective view of a top portion of the case.
Figure 7:
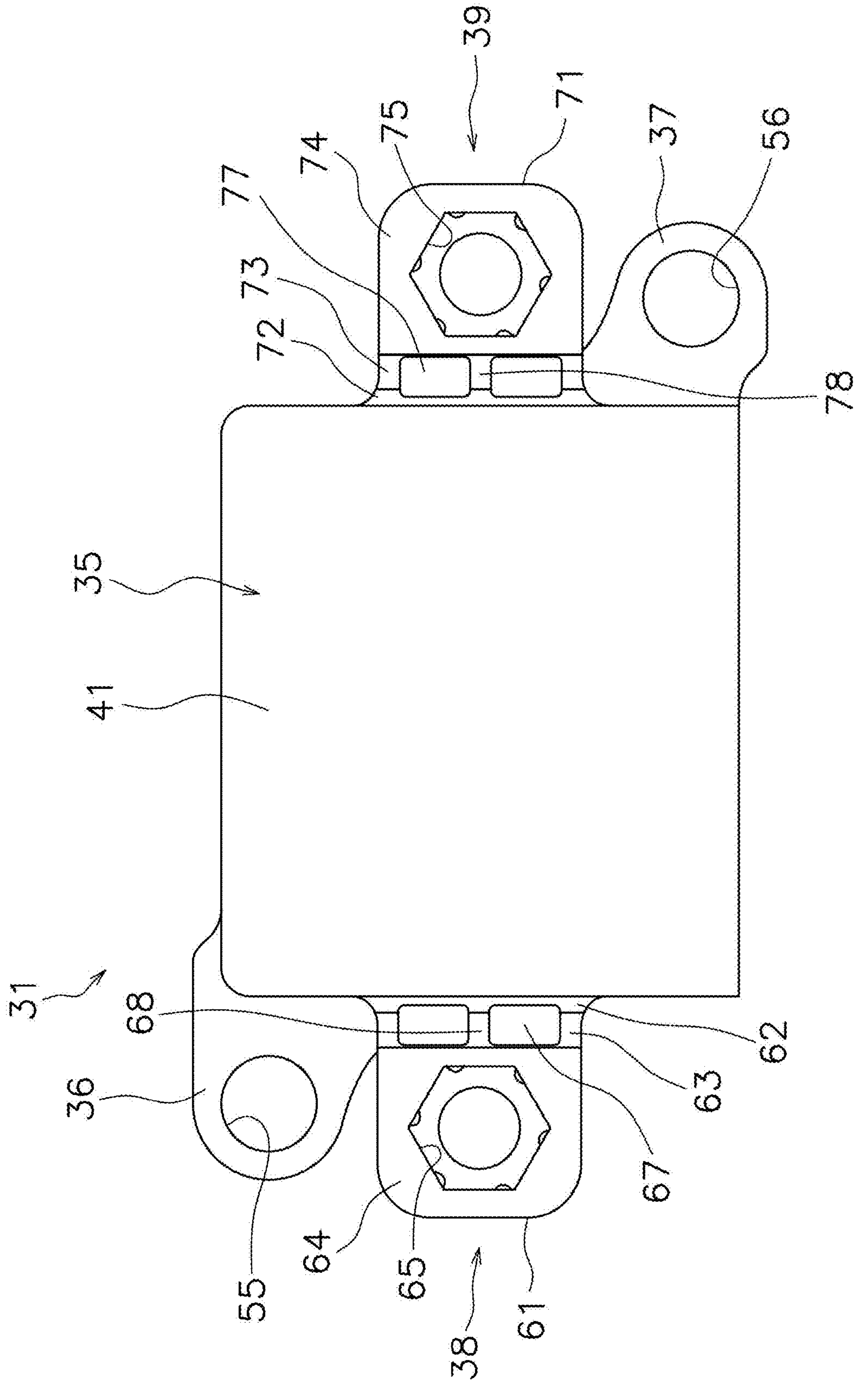
FIG. 7 is a top view of the case.

FIG. 6 is a perspective view of the top portion of the case 31. FIG. 7 is a top view of the case 31. As shown in FIGS. 5 to 7, the case 31 includes a case body 35, a first mount 36, a second mount 37, a first outer-terminal support portion 38, and a second outer-terminal support portion 39. The case body 35 houses the contact device 3 and the drive device 4. The case body 35 includes the opening 33 described above. The opening 33 is disposed on the front surface of the case body 35. The case body 35 includes a top surface 41, a bottom surface 42, a first side surface 43, a second side surface 44, and a rear surface 45.

The case body 35 includes a first slit 46, a second slit 47, and a third slit 48. The first slit 46, the second slit 47, and the third slit 48 extend from the opening 33 in the front-rear direction. The first slit 46 is disposed on the first side surface 43. The first outer terminal portion 15 extends through the first slit 46. The second slit 47 is disposed on the second side surface 44. The second outer terminal portion 18 extends through the second slit 47.

The third slit 48 is disposed on the first side surface 43. The third slit 48 is disposed below the first slit 46. The connector 49 shown in FIG. 1 extends through the third slit 48. The connector 49 is connected to the coil 23.

As shown in FIGS. 1 and 2, the cover 32 includes a cover body 51, a first cover portion 52, a second cover portion 53, and a third cover portion 54. The cover body 51 is disposed within the opening 33. The cover body 51 closes the opening 33. The first cover portion 52 extends from the cover body 51. The first cover portion 52 is disposed within the first slit 46. The first cover portion 52 closes the first slit 46. The second cover portion 53 extends from the cover body 51. The second cover portion 53 is disposed within the second slit 47. The second cover portion 53 closes the second slit 47. The third cover portion 54 extends from the cover body 51. The third cover portion 54 is disposed in the third slit 48. The third cover portion 54 closes the third slit 48.

The adhesive 34 bonds the cover body 51 to the case 31, within the opening 33. The adhesive 34 bonds the first cover portion 52 within the first slit 46. The adhesive 34 bonds the second cover portion 53 within the second slit 47. The adhesive 34 bonds the third cover portion 54 within the third slit 48.

The first mount 36 is connected to the first side surface 43. The first mount 36 protrudes laterally from the first side surface 43. The first mount 36 is disposed flush with the bottom surface 42. The first mount 36 includes a first mounting hole 55. A bolt for fixing the electromagnetic relay 1 is passed through the first mounting hole 55. The second mount 37 is connected to the second side surface 44. The second mount 37 protrudes laterally from the second side surface 44. The second mount 37 protrudes from the second side surface 44 to the opposite side of the first mount 36 in the left-right direction. The second mount 37 is disposed flush with the bottom surface 42. The second mount 37 includes a second mounting hole 56. A bolt for fixing the electromagnetic relay 1 is passed through the second mounting hole 56.

The first outer-terminal support portion 38 is connected to the first side surface 43. The first outer-terminal support portion 38 protrudes laterally from the first side surface 43. The first outer-terminal support portion 38 is disposed below the first outer terminal portion 15. The first outer-terminal support portion 38 supports the first outer terminal portion 15. The second outer-terminal support portion 39 is connected to the second side surface 44. The second outer-terminal support portion 39 protrudes laterally from the second side surface 44. The second outer-terminal support portion 39 protrudes from the second side surface 44 to the opposite side of the first outer-terminal support portion 38 in the left-right direction. The second outer-terminal support portion 39 is disposed below the second outer terminal portion 18. The second outer-terminal support portion 39 supports the second outer terminal portion 18. The first outer-terminal support portion 38 and the second outer-terminal support portion 39 are integrally formed with the case body 35.

Figure 8:
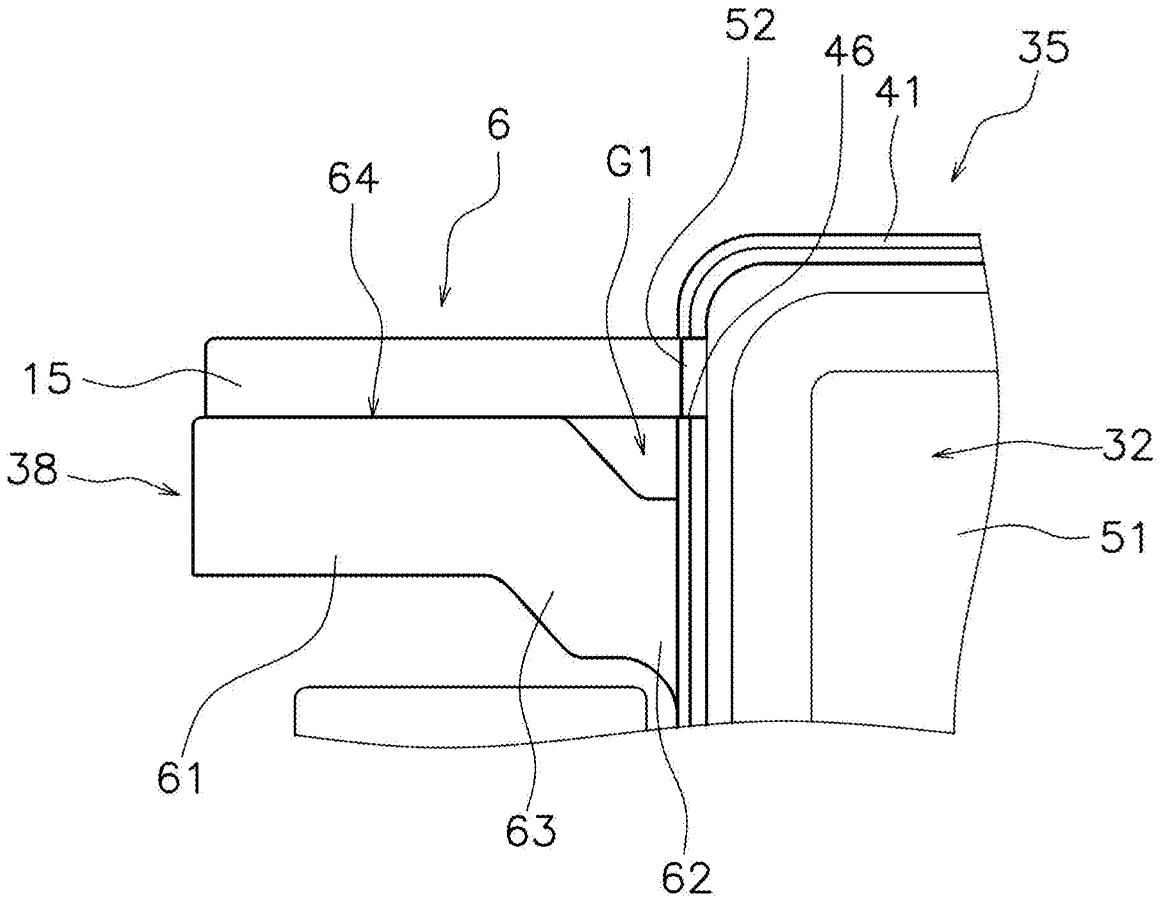
FIG. 8 is an enlarged view of a first support portion.

FIG. 8 is an enlarged view of the first outer-terminal support portion 38. As shown in FIG. 8, the first outer-terminal support portion 38 includes a first flat portion 61, a first connection portion 62, and a first intermediate portion 63. The first flat portion 61 extends in the left-right direction. The first flat portion 61 includes a first support surface 64. The first support surface 64 has a flat shape. The first support surface 64 is in contact with the first outer terminal portion 15 and supports the first outer terminal portion 15.

The first connection portion 62 is disposed between the first support surface 64 and the first side surface 43. The first connection portion 62 is connected to the first side surface 43. The first connection portion 62 is disposed below the first support surface 64. The first connection portion 62 is disposed downward and away from the first outer terminal portion 15. The first connection portion 62 is disposed with a gap G1 with respect to the first outer terminal portion 15. The first connection portion 62 is disposed downward and away from the first slit 46.

The first intermediate portion 63 is disposed between the first flat portion 61 and the first connection portion 62. The first intermediate portion 63 is connected to the first flat portion 61 and the first connection portion 62. The first intermediate portion 63 extends in a direction inclined to the first outer terminal portion 15. The first intermediate portion 63 extends diagonally upward from the first connection portion 62 toward the first flat portion 61. The first intermediate portion 63 is also disposed with the gap G1 with respect to the first outer terminal portion 15.

As shown in FIGS. 6 and 7, the first outer-terminal support portion 38 includes a first nut compartment 65. The first nut compartment 65 is recessed from the first support surface 64. The first nut compartment 65 faces the first through-hole 16. As shown in FIG. 3, a first nut 66 is disposed in the first nut compartment 65. The first nut 66 may be disposed in the first nut compartment 65 by insert molding. The first nut 66 faces the first through-hole 16 of the first fixed terminal 6. A connecting member, such as a bus bar, is secured to the first fixed terminal 6 by a bolt that is passed through the first nut 66 and the first through-hole 16.

The first outer-terminal support portion 38 includes a first recess 67 and a first rib 68. The first recess 67 is recessed from the top surface of the first intermediate portion 63. The first rib 68 is disposed in the first recess 67. The first rib 68 extends in the left-right direction within the first recess 67. The first rib 68 increases the strength of the first intermediate portion 63.

Figure 9:
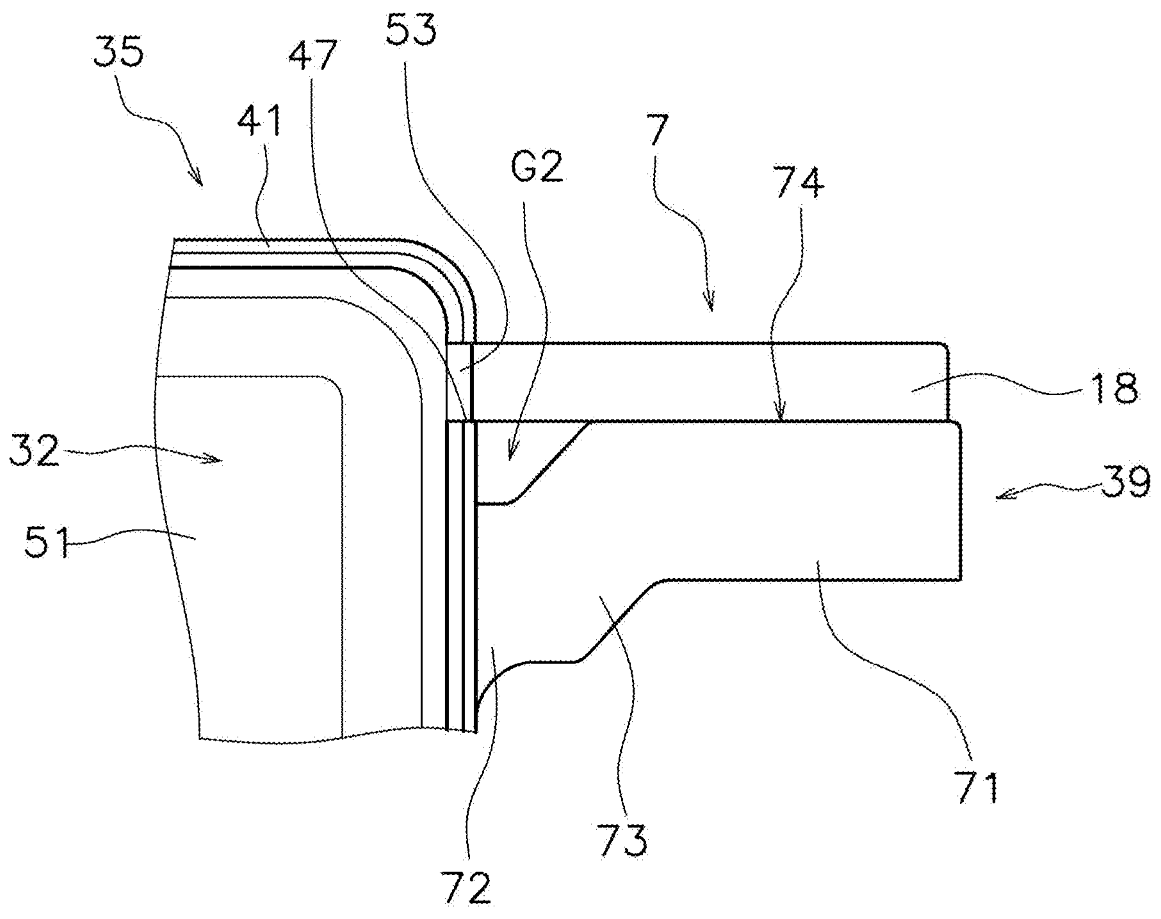
FIG. 9 is an enlarged view of a second support portion.

FIG. 9 is an enlarged view of the second outer-terminal support portion 39. As shown in FIG. 9, the second outer-terminal support portion 39 includes a second flat portion 71, a second connection portion 72, and a second intermediate portion 73. The second outer-terminal support portion 39 has a structure symmetrical to the first outer-terminal support portion 38. The second flat portion 71, the second connection portion 72, and the second intermediate portion 73 have the same structure as the first flat portion 61, the first connection portion 62, and the first intermediate portion 63, respectively. The second connection portion 72 is disposed with a gap G2 with respect to the second outer terminal portion 18 in the same manner as the first connection portion 62 is disposed with the gap G1 with respect to the first outer terminal portion 15.

The second flat portion 71 includes a second support surface 74 and a second nut compartment 75. The second support surface 74 and the second nut compartment 75 have the same structure as the first support surface 64 and the first nut compartment 65, respectively. A second nut 76 is disposed in the second nut compartment 75. The second outer-terminal support portion 39 includes a second recess 77 and a second rib 78. The second recess 77 and the second rib 78 have the same structure as the first recess 67 and the first rib 68, respectively.

In the above-described electromagnetic relay 1, in the first outer-terminal support portion 38, the first connection portion 62 is disposed with the gap G1 with respect to the first outer terminal portion 15. Therefore, when torque from bolting is applied to the first outer terminal portion 15, it is difficult for the torque to be transmitted to the first connection portion 62. In the second outer-terminal support portion 39, the second connection portion 72 is disposed with the gap G2 with respect to the second outer terminal portion 18. Therefore, when torque from bolting is applied to the second outer terminal portion 18, it is difficult for the torque to be transmitted to the second connection portion 72. This increases the strength of the housing 2 against torque caused by bolting.

Although one embodiment of the claimed invention has been described above, the invention is not limited to the above embodiment, and various changes can be made without departing from the scope of the claimed invention.

The structure of the drive device 4 is not limited to that of the above embodiment, but may be modified. For example, the separation direction (Z2) and the contact direction (Z1) may be opposite to the above embodiment. The first fixed terminal 6 and the second fixed terminal 7 may protrude from the housing 2 not only in the left-right direction but also in the front-back direction.

The structure of the contact device 3 is not limited to that of the above embodiment, but may be modified. For example, the first fixed contact 10 may be a separate body from the first fixed terminal 6, or integral with the first fixed terminal 6. The second fixed contact 11 may be a separate body from the second fixed terminal 7, or integral with the second fixed terminal 7. The first movable contact 12 may be a separate body from the movable contact piece 8, or may be integral with the movable contact piece 8. The second movable contact 13 may be a separate body from the movable contact piece 8, or may be integral with the movable contact piece 8.

REFERENCE SIGNS LIST

2: Housing, 6: First fixed terminal, 8: Movable contact piece, 10: First fixed contact, 12: First movable contact, 14: First contact support, 15: First outer terminal, 16: First through-hole, 32: Cover, 33: Opening, 34: Adhesive, 35: Case body, 38: First support portion, 46: First slit, 62: First connection portion, 63: First intermediate portion, 64: First support surface, 65: First nut compartment, 67: First recess, 68: First rib

The invention claimed is:

1. An electromagnetic relay, comprising:
a fixed contact;
a fixed terminal including an outer terminal portion and a contact support portion connected to the fixed contact, the fixed terminal having a plate shape;
a movable contact facing the fixed contact;
a movable contact piece connected to the movable contact; and
a housing including
a body housing the contact support, the fixed contact, the movable contact, and the movable contact piece, the body having an opening,
a cover attached to the body, the cover closing the opening,
an adhesive bonding the body and the cover, and
a support portion protruding laterally from the body, the support portion being disposed below the outer terminal portion of the fixed terminal protruding laterally from the body to support the outer terminal portion of the fixed terminal,
the support portion including
a support surface in contact with the outer terminal portion of the fixed terminal, and
a connection portion disposed between the support surface and the body, the connection portion being connected to the body, the connection portion being disposed with a gap between it and the outer terminal portion of the fixed terminal.

2. The electromagnetic relay according to claim 1, wherein the support portion includes a nut compartment recessed from the support surface.

3. The electromagnetic relay according to claim 2, wherein the outer terminal portion of the fixed terminal includes a through-hole for a bolt, the through-hole facing the nut compartment.

4. The electromagnetic relay according to claim 1, wherein
the support portion further includes an intermediate portion disposed between the connection portion and the support surface, and
the intermediate portion extends in a direction inclined to the outer terminal portion of the fixed terminal.

5. The electromagnetic relay according to claim 4, wherein
the support portion includes
a recess recessed from a surface of the intermediate portion, and
a rib disposed in the recess.

6. The electromagnetic relay according to claim 1, wherein
the body includes a slit extending from the opening, and the outer terminal extends through the slit.

7. The electromagnetic relay according to claim 1, wherein the connection portion is spaced away from the slit.

* * * * *